July 25, 1967

H. BROSCHKE ET AL 3,332,330

PHOTOCELL ARRANGEMENT IN CAMERA

Filed Aug. 9, 1965

Heinrich Broschke
Werner Holle
Günther Meinecke
Erich Mandler

INVENTORS

BY Spencer & Kaye

Attorneys

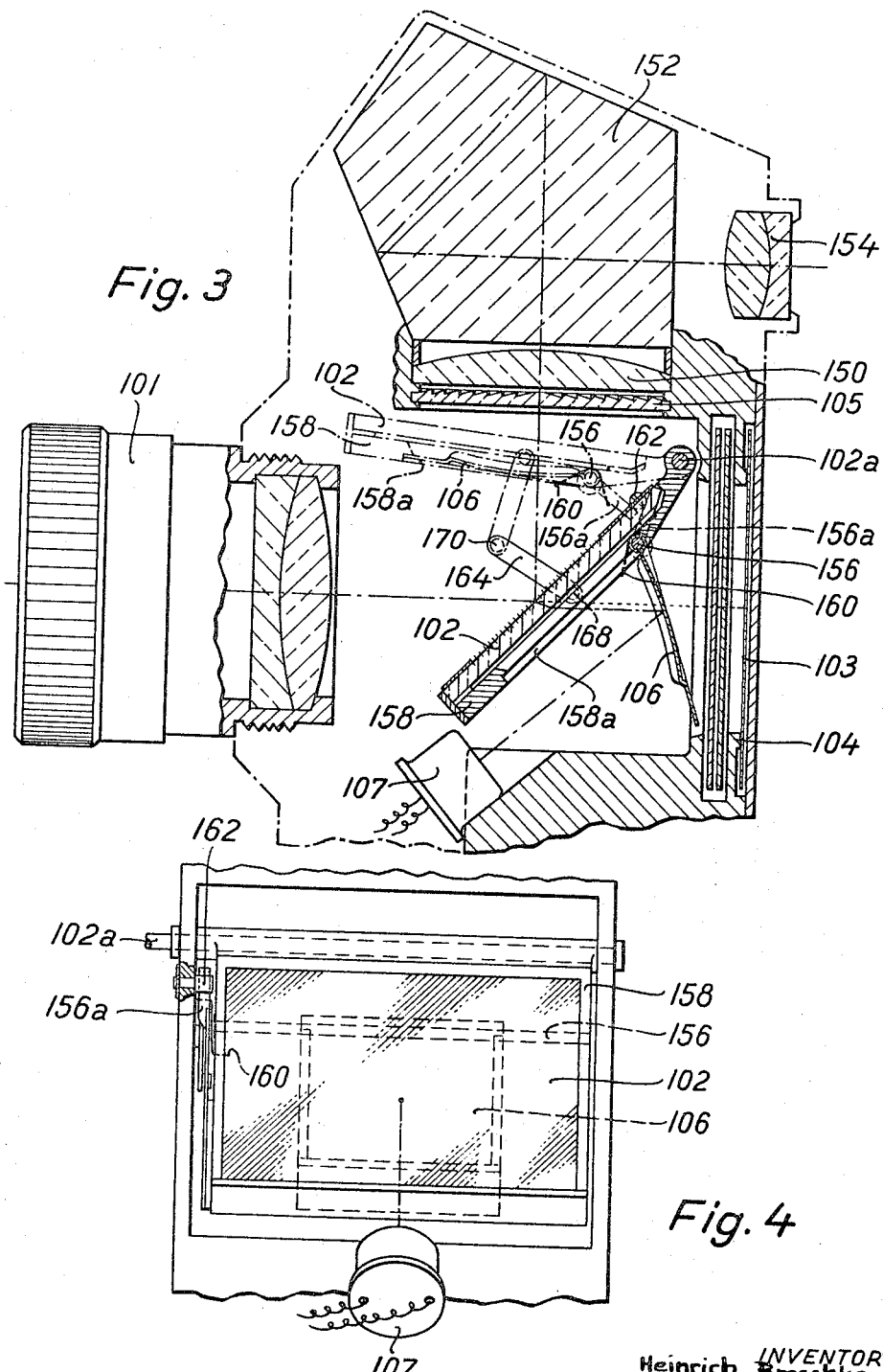

July 25, 1967 H. BROSCHKE ET AL 3,332,330
PHOTOCELL ARRANGEMENT IN CAMERA
Filed Aug. 9, 1965 5 Sheets-Sheet 3
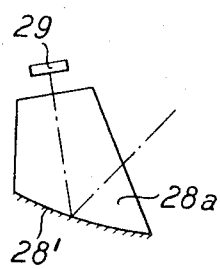
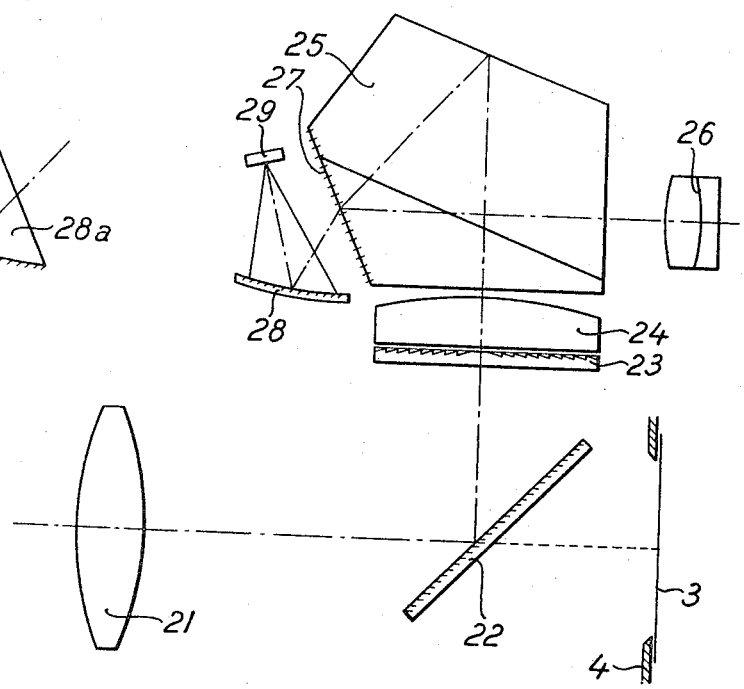
Heinrich Broschke
Werner Holle
Günther Meinecke
Erich Mandler
INVENTORS
BY Spencer & Kaye
Attorneys INVENTORS
Heinrich Broschke
Werner Holle
Günther Meinecke
Erich Mandler
BY Spencer & Kaye
Attorneys

United States Patent Office 3,332,330
Patented July 25, 1967

3,332,330
PHOTOCELL ARRANGEMENT IN CAMERA
Heinrich Broschke, Werner Holle, and Gunther Meinecke, Wetzlar, and Erich Mandler, Waldgirmes, Kreis Wetzlar, Germany, assignors to Ernst Leitz G.m.b.H., Wetzlar, Germany
Filed Aug. 9, 1965, Ser. No. 478,068
Claims priority, application Germany, Oct. 7, 1964, L 48,967
18 Claims. (Cl. 95—42)

The present invention relates to cameras, and more particularly to a light meter arrangement for a single-lens reflex camera, especially a camera which is equipped with a plurality of interchangeable objective lenses.

As is well known in the art, the exposure time is best determined by measuring the light through the objective lens, inasmuch as this inherently takes into consideration the angular field picked up by the lens, and there exist single-lens reflex cameras in which the hinged mirror, i.e., the mirror which is pivotable into and out of an operative position in which it lies between the objective lens and the film and in which it reflects the light coming through the objective lens onto a focussing screen, such as a ground glass plate, is fashioned as a beam divider, with so much of the light which passes through the mirror being used for measuring the light. Such a camera has a number of drawbacks. For one thing, the light-sensitive element which is used to pick up the light passing through the mirror has to have a relatively large area. Furthermore, the light-sensitive element must be arranged as near as possible to the plane of the film and must, prior to the taking of a picture, be moved out of hte path of the light beam which enters the camera through the objective lens and impinges upon the film.

Other attempts in this direction have resulted in a camera in which a surface of the deviation prism which is conventionally arranged in the path of the view finder light beam is provided with a partly reflective coating and to position the light-sensitive element behind this coating.

In another single-lens reflex camera, a flat mirror is provided in the field lens which is arranged near the focussing screen, this flat mirror being inclined with respect to the optical axis and serving laterally to deflect a portion of the view finder light beam onto a light-sensitive element which is arranged next to the field lens.

All of the above-described devices have the drawback that the light measurement is not independent of the focal length and the largest aperture of the individual objective lenses which are to be used with the camera. Furthermore, the light-sensitive element has to have a large area in order to enable it to pick up a sufficiently large portion of the image, for otherwise the individual image points will not contribute uniformly to the measurement being taken.

It is, therefore, the primary object of the present invention to provide a light meter arrangement for a single-lens reflex camera which overcomes the above drawbacks, and, with this object in view, the present invention resides, basically, in a light meter arrangement for a reflex camera having objective lens means and finder means, which light meter arrangement comprises a light-sensitive element and means which form a partly reflective light beam divider component arranged in the path of the light rays coming through the objective lens means and going to the finder means and a concave mirror component for reflecting onto the light-sensitive element light which, as the result of the beam division, is taken out of the path of the light rays going to the finder means. The two components may, in accordance with the present invention, either be constituted by the same physical entity, or they may be two physically distinct entities. The radius of curvature of the concave mirror component, and the distance between it and the light-sensitive element, are such that any light beam that transmits the image of the light-sensitive element into the space occupied by the objective lens means does not intersect the exit pupil of the objective lens means.

Additional objects and advantages of the present invention will become apparent upon consideration of the following description when taken in conjunction with the accompanying drawings in which:

FIGURE 3 is a sectional elevational view of another embodiment of the present invention, differing from that depicted in FIGURE 1 in that the concave mirror is pivotally connected to the hinged mirror.

FIGURE 4 is a plan view of the structure shown in FIGURE 3.

FIGURE 5 is a schematic elevation of another embodiment of the present invention, wherein the beam divider component is part of the optical system leading to the finder lens.

FIGURE 6 is a fragmentary elevation showing a modification of the embodiment depicted in FIGURE 5.

Figure 1:
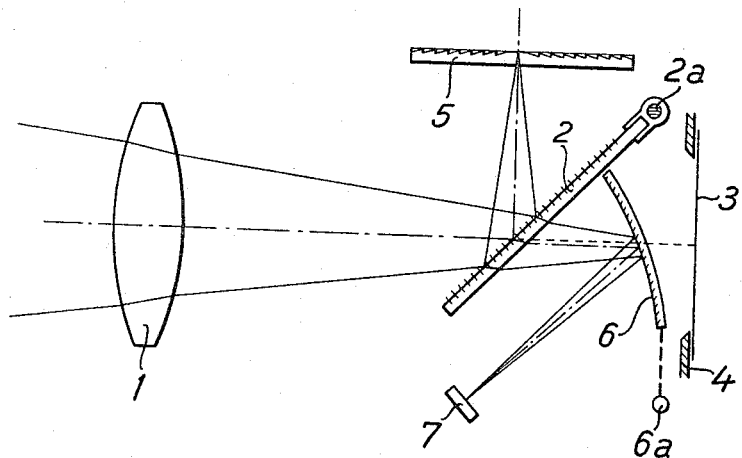
FIGURE 1 is a schematic elevation of one embodiment of the present invention, wherein the hinged mirror of the camera serves as the beam dividing component.

Referring now to the drawings and first to FIGURE 1 thereof, the same shows the basic components of one embodiment of a single-lens reflex camera according to the present invention. These components include an objective lens 1 through which the light beam enters the camera from the outside, and a hinged mirror 2 which itself is a partial mirror, i.e., a mirror which is provided with a mirror coating that is partly light-permeable so as to enable the mirror to serve as a beam divider. This is depicted symbolically, in the drawing, by short right-angle lines crossing the surface of the mirror. The mirror 2 is pivotally mounted, in a manner conventional in single-lens reflex cameras, the pivotal mounting being shown schematically at 2a. When the mirror 2 is in the "operative" position shown in FIGURE 1, it reflects part of the light beam coming through the objective lens 1 onto the finder means or focusing screen 5, e.g., a Fresnel lens, thereby to form an image of the object being photographed (not shown) in the image plane of the focussing screen 5. The film 3 is passed behind a film holder 4 which positions the film 3 in the focal plane.

Arranged between the mirror 2 and the film holder 4 is a concave mirror 6, the full-mirror characteristics of which are depicted, symbolically, by short oblique lines ending at the mirror surface. This concave mirror 6, which may be a Fresnel mirror, reflects into a light-sensitive element 7, such as a photo-resistor, that portion of the light beam coming through the exit pupil of the objective lens 1 which, as the result of the beam division, is taken out of the path of the light rays going to the screen 5, i.e., that portion of the light which is passed by the partly reflective mirror 2. The mirror 6 itself may be pivotally connected to the mirror 2, as will be explained below in conjunction with FIGURES 3 and 4, or the mirror 6 may be pivotally connected to the camera, as shown at 6a. In either case, the arrangement is such that both the mirror 2 and the mirror 6 can be moved to an inoperative position, i.e., out of the path of a light beam coming from the objective lens and going to the film 3.

The radius of curvature of the concave mirror 6 and the distance which the light-sensitive element 7 is spaced from this mirror are such that the beam of light which reproduces the light-sensitive element, with the help of the concave mirror, within the space occupied by the objective lens 1, does not intersect the exit pupil of the lens.

If the camera is designed for use with a plurality of interchangeable objective lenses, the radius of curvature of the concave mirror and the distance between this concave mirror and the light-sensitive element is such that none of the light beams that transmit the image of the light-sensitive element into the space occupied by any one of the interchangeable objective lenses intersects the exit pupil of any of the objective lenses.

Figure 2:
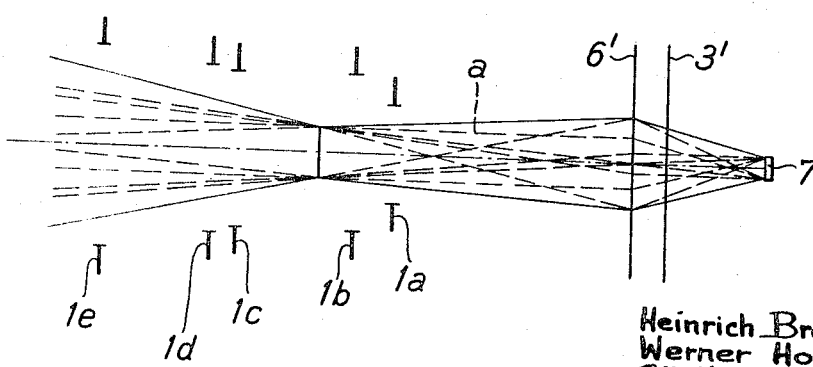
FIGURE 2 is a schematic illustration showing the light beams which produce the images of the light-sensitive element in the space occupied by any one of several interchangeable objective lenses which may be used with the camera.

This is depicted diagrammatically in FIGURE 2, in which the light-sensitive element is shown at 7' and the light beams which depict the element 7' in the space occupied by any one of the objective lenses are shown at a. For schematic reasons, the concave mirror is shown as having been replaced by a light-refracting surface 6'. FIGURE 2 shows the exit pupils 1a, 1b, 1c, 1d and 1e, of five different objective lenses having different focal lengths, and it will be seen that the light beams a clear, i.e., do not intersect, the respective exit pupils.

By virtue of the above arrangement, the exit pupil of at least one objective lens, of given focal length, can be reproduced exactly on the light-sensitive element, while such inaccuracies as result when the exit pupils of other objective lenses having different focal lengths are reproduced will be at least substantially compensated due to their opposing effects.

FIGURE 2 also shows the position of the film plane 3' relative to the exit pupils of the different objective lenses.

The precise radius of curvature of the concave mirror and the precise distance which the light-sensitive element is spaced from this mirror may readily be determined empirically. In one actual embodiment, the radius of curvature of the concave mirror was 40 mm. and the distance between the mirror and the light-sensitive element was 24 mm.

The embodiment illustrated in FIGURES 3 and 4 differs from that of FIGURE 1 in that the concave mirror 106 is pivotally connected to the partly reflective mirror 102 rather than to the camera housing itself. The other basic component parts 101, 103, 104, 105 and 107 correspond to the parts 1, 3, 4, 5 and 7 of the embodiment of FIGURE 1, with FIGURE 3 additionally showing a view finder optic system comprising a field lens 150, a pentaprism 152, and a finder lens 154, as well as the shaft 102a on which the mirror 102 is pivotally mounted. The concave mirror 106 is non-rotatably secured to a shaft 156 which is rotatably mounted on the frame 158 of the mirror 102. One end 156a of the shaft 156 is angled and, under the influence of a spring 160, bears against an abutment pin 162 which is secured to the camera housing. FIGURE 3 also shows a link 164, one end of which is pivotally connected, at 168, to the frame 158 of the mirror 102, the other end of this link being secured to a shaft 170, which may be rotated from outside of the camera.

The mechanism operates as follows:

When the parts are in the positions shown, in FIGURE 3, in solid lines, in which the mirror 102 reflects part of the light coming through the objective lens 101 toward the screen 105 and the finder optic, the concave mirror 106 is maintained in the path of the light that passes through the mirror 102, by means of the spring 160 which itself is interposed between the frame 158 of mirror 102 and the bent end 156a of shaft 156. The light reflected by the mirror 106 is thus reflected toward the light-sensitive element 107.

If the shaft 170 is then rotated and the mirror 102 pivoted from the operative position shown in solid lines into the inoperative position shown in phantom lines, the bent end 156a will cam against the pin 162 so that the shaft 156, and with it the mirror 106, will be pivoted relative to the frame 158 against the action of the spring 160, such that when the mirror 102 is out of the path of the light beam coming into the camera through the objective lens 101, the mirror 106 will not only have been carried along by the pivoting of the frame 158, but will also have have pivoted with respect to that frame until the mirror 106 is nested within a recess 158a that is provided on the rear side of frame 158. In this way, the mirror 106, too, will be out of the path of the light beam coming in through the objective lens 101.

The nesting of the mirror 106 within the frame 158 carrying the mirror 102 may be utilized to advantage by so dimensioning the mirror 106 and recess 158a that the mirror 106 closes off the recess completely, thereby to shut out any light which might otherwise penetrate through the partly light-permeable mirror 102 into the interior of the camera through the finder optic.

For adjustment purposes, the pin 162 may be adjustably mounted on the side wall of the camera.

In the embodiment of FIGURE 5, the light beam coming through the objective lens 21 is reflected by the hinged mirror 22—which, in the instant embodiment, is completely mirrored in the sense that it does not allow any of the light to pass through—onto the focussing screen 23. Arranged above this screen 23 is a field lens 24 and a pentaprism 25 which reflects the light beam through a finder lens 26. One of the reflection surfaces of the pentaprism 25, namely, the surface 27, is partially mirrored, again as depicted symbolically by the short right-angle lines. The light penetrating the surface 27 reaches a concave mirror element 28, which itself reflects the light onto the photo-sensitive element 29. In this embodiment, then, it is the surface 27 and not the hinged mirror 22 which serves as the light beam divider.

As shown in FIGURE 6, the concave mirror may be constituted by a mirrored surface 28' of a prism 28a, which itself may be cemented directly to the pentaprism 25 shown in FIGURE 5.

Figure 7:
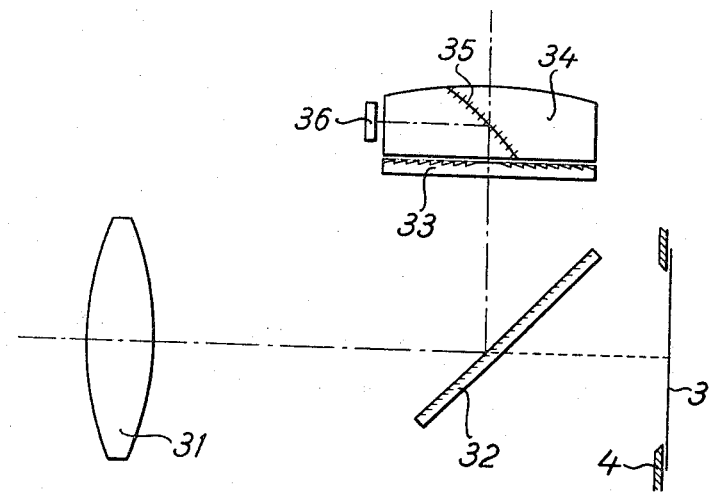
FIGURE 7 is a schematic elevation of yet another embodiment of the present invention, wherein the beam divider component and the concave mirror component are constituted by the same physical entity.
Figure 8:
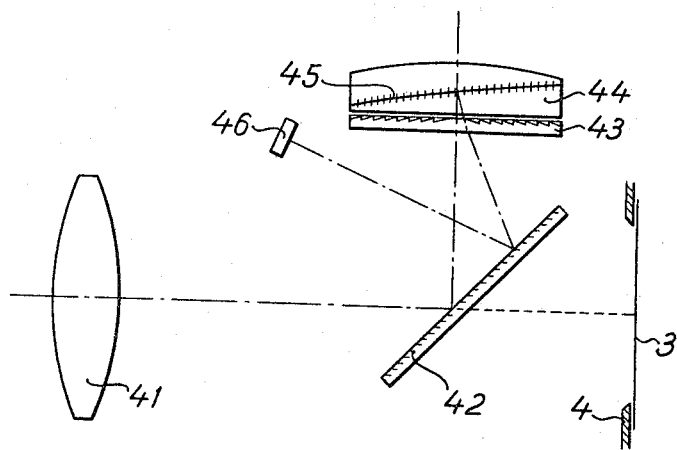
FIGURE 8 is a schematic elevation of a modification of the embodiment illustrated in FIGURE 7, in that the light is reflected by the concave mirror onto the light-sensitive element via the hinged mirror.
Figure 9:
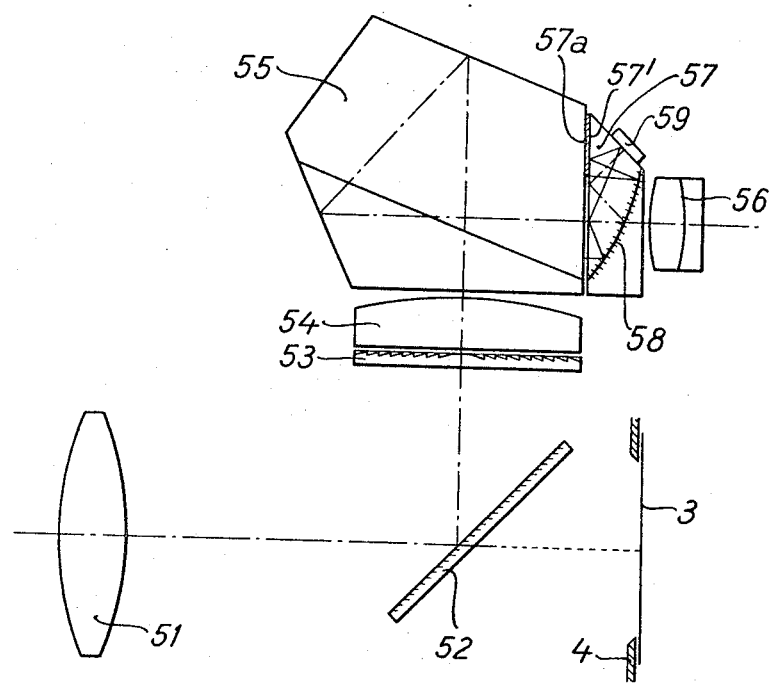
FIGURE 9 is a schematic elevation of a still further embodiment of the present invention, wherein the single physical entity serving as both the beam divider component and the concave mirror component is arranged between a deviation prism and the finder lens.

The embodiments of the present invention shown in FIGURES 7, 8 and 9 differ from the embodiments described so far in that in each of the embodiments of FIGURES 7, 8 and 9, the beam divider component and the concave mirror component, instead of being two physically distinct entities, are constituted by the same physical entity. Thus, in the embodiment of FIGURE 7, there is provided a partly mirrored surface which itself has a concave configuration and serves both as the beam divider component and as the concave mirror component. As in the case of the other embodiments, the light passes into the interior of the camera through the objective lens 31 and is reflected by the hinged mirror 32, toward the focussing screen 33 to form the image. The field lens 34 arranged above the screen 33 is itself provided with a concave partial mirror surface 35 which deflects part of the light onto the light-sensitive element 36, the same being arranged at the side of the field lens 34. The light which passes through the partly mirrored concave surface 35 then passes on to the other optical elements of the finder means, e.g., the pentaprism and the finder lens (not shown in FIGURE 7).

The embodiment of FIGURE 8 differs from that of FIGURE 7 in that the light passing through the objective lens 41, reflected by the mirror 42 and passing through the focussing screen 43 and the field lens 44 encounters a partly mirrored concave surface 45 in the lens 44, which surface 45, instead of directing part of the light beam directly against the light-sensitive element 46, is oriented to do so via the mirror 42. It is thus possible, in the embodiment of FIGURE 8, to make the partly light-permeable concave surface 45 pick up the entire image so that the light-sensitive element will be illuminated integrally. If, on the other hand, the embodiment of FIGURE 8 is to be used under conditions when only a portion of the image is to be used for purposes of obtaining a light measurement, the surface 45 can be limited to extend over but a portion of the area of the lens 44, preferably the central portion. In that case, the light intensity of the remaining portion of the image, i.e., so much of the image as lies outside of the limits defined by the surface 45, should be reduced, by conventional means, so that the light beam in the view finding path will itself remain uniform.

In the embodiment of FIGURE 9, the light beam passes through the objective lens 51, is reflected by the mirror 52, and passes through the focussing screen 53, the field lens 54, the pentaprism 55 and the finder lens 56. Interposed between the pentaprism 55 and the finder lens 56 is a glass member 57 which is provided with a partial concave mirror surface 58 that reflects part of the view finder light beam onto the light-sensitive element 59, while utilizing the total reflection of the surface 57′ of the member 57, this being the surface which is next to the pentaprism. The element 57 may be secured to the pentaprism 55 by means of a spacer 57a. As shown in the drawing, the light-sensitive element is arranged in a plane between the pentaprism 55 and the finder lens 56 but is above the optical axis between the pentaprism 55 and the finder lens 56, i.e., outside of the light rays going to the finder lens.

Figure 10:
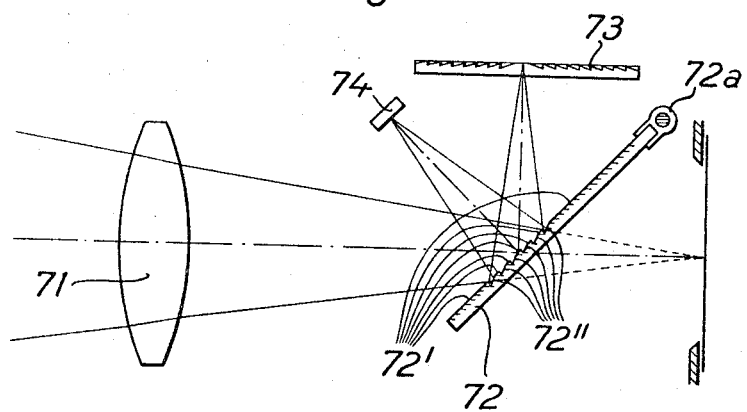
FIGURE 10 is a schematic elevation of yet another embodiment of the present invention wherein the concave mirror component is worked into the hinged mirror.

In each of the above-described embodiments, the partly mirrored surface may be constituted by a physical beam divider or by a geometric beam divider, i.e., the beam divider surface may be coated throughout with partial mirroring which passes a certain percentage of the light, or the beam divider surface may be provided with alternate geometric areas of which some pass light and other do not, the percentage of light being passed being dependent on the relative sizes of the light permeable and light impermeable areas. Such geometric beam divider is shown in the embodiment of FIGURE 10, in which the concave mirror which reflects light onto the light-sensitive element is worked into the hinged mirror. The mirror 72, hinged at 72a, is geometrically divided into a first component 72′ which reflects part of the light coming from the objective lens to the focussing screen 73, and a second, Fresnel-mirror like concave component 72″ which reflects the remainder of the light coming through the objective lens 71 to the light-sensitive element 74.

It will be understood that the above description of the present invention is susceptible to various modifications, changes and adaptations, and the same are intended to be comprehended within the meaning and range of equivalents of the appended claims.

What is claimed is:

1. A light meter arrangement for a reflex camera having objective lens means and finder means, said light meter arrangement comprising, in combination:
 (a) a light-sensitive element; and
 (b) means forming a partly reflective light beam divider component arranged in the path of the light rays coming through the objective lens means and going to the finder means and a concave mirror component for reflecting onto said light-sensitive element light which, as the result of the beam division effect, is taken out of the path of the light rays going to the finder means, the radius of curvature of said concave mirror component and the distance between said concave mirror component and said light-sensitive element being such that any light beam that transmits the image of said light-sensitive element into the space occupied by the objective lens means does not intersect the exit pupil of the objective lens means.

2. The combination defined in claim 1 wherein said partly reflective beam divider component and said concave mirror component are two physically distinct entities.

3. The combination defined in claim 2 wherein said beam divider component comprises a partly reflective hinged mirror which is pivotable out of its operative position in which it lies in the path of the light rays coming through the objective lens means, and wherein said concave mirror component comprises a concave mirror which is arranged in the path of light rays that are not reflected by said hinged miror.

4. The combination defined in claim 3 wherein said concave mirror is a Fresnel mirror.

5. The combination defined in claim 3 wherein said concave mirror is pivotally connected to said hinged mirror and is movable therewith out of the path of the light rays coming through the objective lens means.

6. The combination defined in claim 3 wherein said concave mirror is pivotally mounted on the camera for movement out of its operative position.

7. The combination defined in claim 2 wherein the camera includes a prism arranged in the path of the light rays going to the finder means, wherein said prism has a partly mirrored reflecting surface which constitutes said beam divider compartment, and wherein said concave mirror component is arranged in the path of light rays that are not reflected by said reflecting surface of said prism.

8. The combination defined in claim 7 wherein said concave mirror component comprises a mirror element.

9. The combination defined in claim 7 wherein said concave mirror component comprises a mirrored surface of a further prism which itself is cemented to the first mentioned prism.

10. The combination defined in claim 1 wherein said partly reflective beam divider component and said concave mirror component are constituted by the same physical entity.

11. The combination defined in claim 10 wherein said means (b) comprises a hinged mirror which itself is pivotable out of its operative position in which it lies in the path of the light rays coming through the objective lens means, said hinged mirror being geometrically divided into a first part which reflects part of the light coming through the objective lens means to the finder means and a second Fresnel-mirror like concave part which reflects the remainder of the light coming through the objective lens means to said light-sensitive element.

12. The combination defined in claim 11 wherein said second part is in the form of concentric or spiral-shaped grooves.

13. The combination defined in claim 10 wherein the camera includes a field lens arranged in the path of the light rays going to the finder means, and wherein said means (b) comprise a partly mirrored concave surface of said field lens.

14. The combination defined in claim 13 wherein said light-sensitive element is arranged laterally of said field lens.

15. The combination defined in claim 13 wherein the camera includes a hinged mirror and wherein said partly mirrored concave surface of said field lens is oriented to reflect part of the light rays going to said finder means onto said light-sensitive element via said hinged mirror.

16. The combination defined in claim 10 wherein the camera includes a prism arranged in the path of the light rays going to the finder means, and wherein said means (b) are arranged between the prism and the finder means.

17. The combination defined in claim 16 wherein said light-sensitive element is arranged in a plane between the reflecting prism and the finder means but outside of the light rays going to the finder means.

18. The combination defined in claim 1 wherein the objective lens means of the camera includes a plurality of interchangeable objective lenses and wherein the radius of curvature of said concave mirror means and the distance between said concave mirror means and said light-sensitive element is such that none of the light beams that transmit the image of said light-sensitive element into the space occupied by any one of the interchangeable objective lenses intersects the exit pupil of any of the objective lenses.

References Cited

UNITED STATES PATENTS 3,127,809   4/1964   Denk _____ 95—42 X

JOHN M. HORAN, *Primary Examiner.*